June 5, 1945.  J. M. KENWORTHY  2,377,697
CHANGE SPEED DEVICE
Filed Aug. 14, 1943 2 Sheets-Sheet 1

Inventor
John M. Kenworthy
By
Attorney

June 5, 1945.　　　J. M. KENWORTHY　　　2,377,697
CHANGE SPEED DEVICE
Filed Aug. 14, 1943　　2 Sheets-Sheet 2
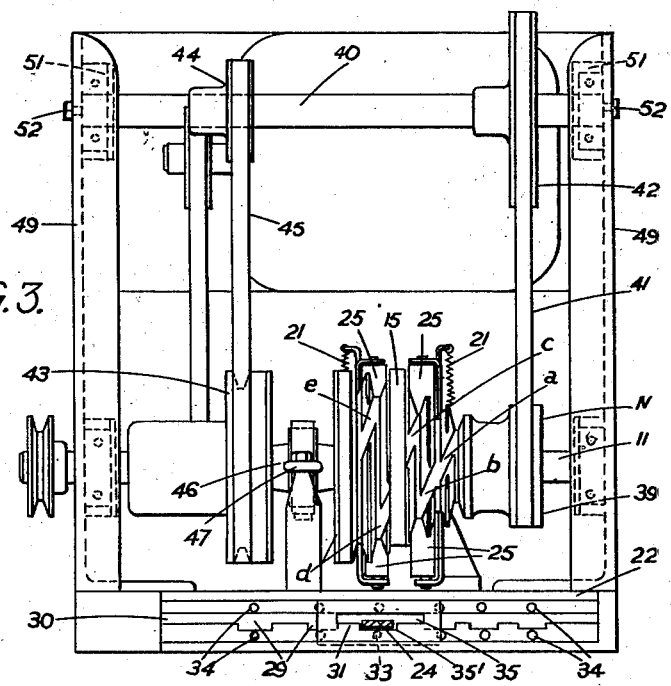
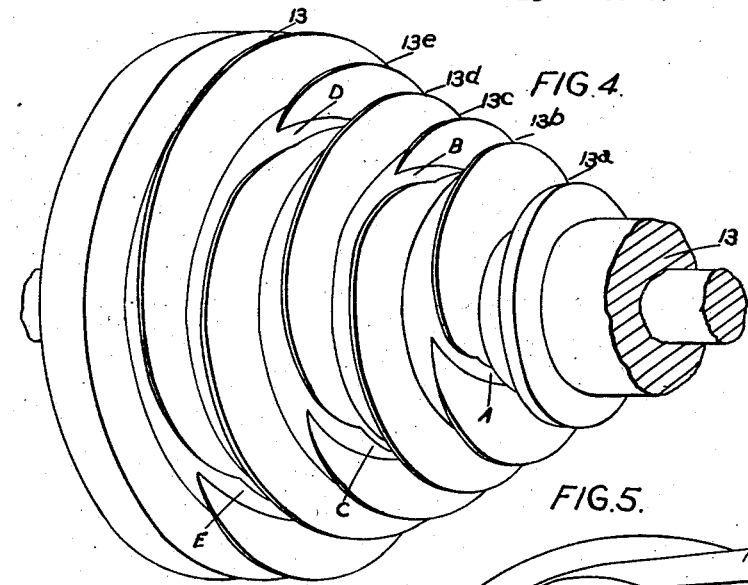
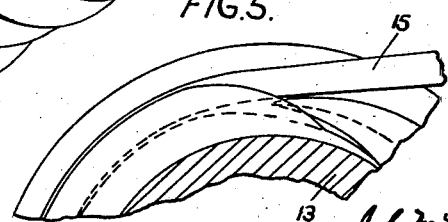
Inventor
John M. Kenworthy,
By
Attorney Patented June 5, 1945

2,377,697

UNITED STATES PATENT OFFICE 2,377,697

CHANGE SPEED DEVICE

John Melville Kenworthy, Gainsborough, England, assignor to Edward Vernon Newey, Castle Donington, England, and Edward Max Blume, London, England Application August 14, 1943, Serial No. 498,677
In Great Britain October 23, 1942

3 Claims. (Cl. 74—242.4)

This invention relates to a new or improved change speed device. Change speed devices in accordance with the present invention may be used for a variety of purposes but are particularly suitable for use on machine tools where it is desired to impart to the tool different speeds of rotation.

An object of the invention is to provide a change speed device, particularly a change speed device suitable for use on machine tools, which is comparatively cheap to produce, can be built as a unitary structure and applied to different machines and is simple and efficacious in use, the device may alternatively constitute an integral part of a machine.

With the above and other objects in view the invention provides a change-speed device of the type comprising two grooved stepped pulleys mounted in an opposite sense, an endless belt running in the grooves to transmit the drive from one pulley to the other, passageways on each pulley leading in opposite directions between successive grooves, and a belt shifter for shifting the belt, through the passageways, between successive steps on the pulley, which belt shifter is provided with rotatably mounted members for engaging the belt while being shifted from one step to the next, which movement would otherwise be obstructed by the flange that necessarily lies between the two diameters of the pulley. If each pulley has more than two steps, it is preferred that a passageway shall be provided between each step and the next.

Since it is necessary that the belt shall be capable of being shifted in either direction between any two successive steps (i. e. in increasing and decreasing the gear ratio) it is desirable that there shall be two passageways leading in opposite directions between successive steps, one for conducting the belt from the smaller to the larger diameter and the other for conducting it in the reverse direction.

The invention also includes a stepped grooved pulley with a belt passageway between each or selected of the steps.

The foregoing and other features of the invention set out in the appended claims are incorporated in the construction which will now be described, as an example, with reference to the accompanying drawings, in which Figure 1 is a sectional plan of a change-speed unit according to this invention;

Figure 4 is a perspective view of a stepped pulley according to this invention, and Figure 5 is a cross section, partly broken away, thereof.

Figure 1:
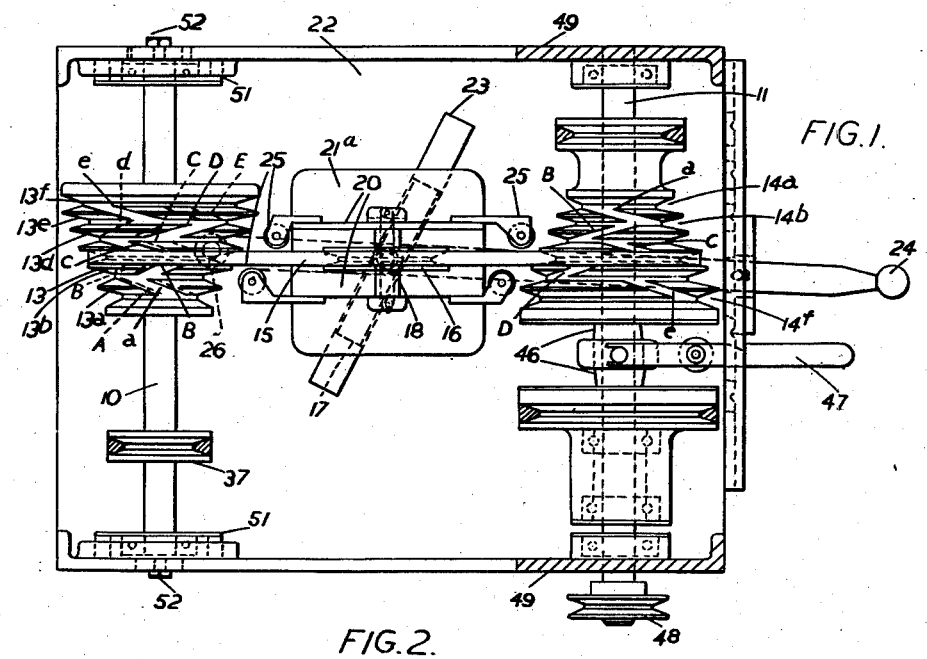
Figure 2:
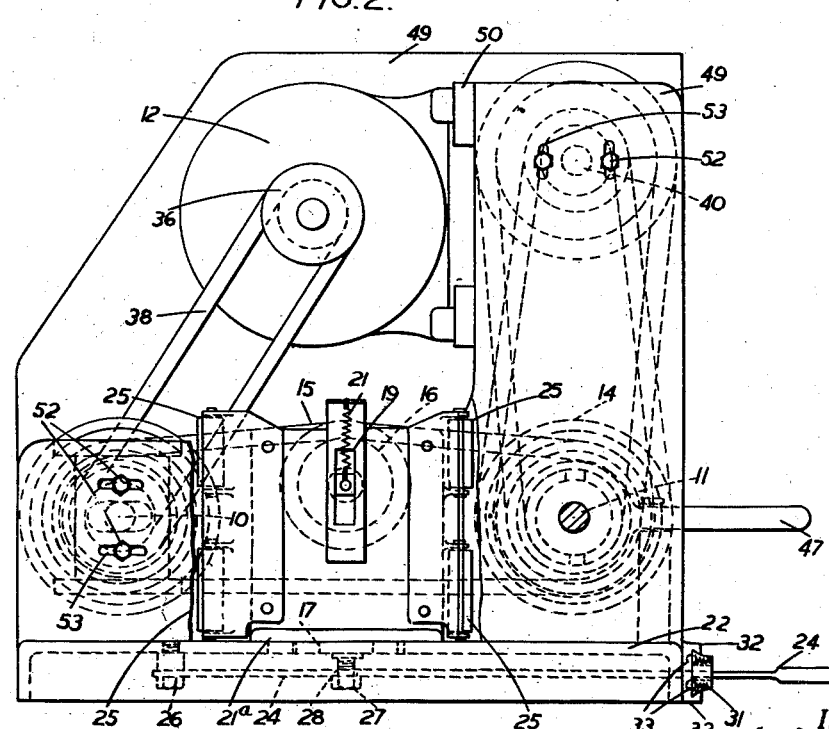
Figure 2 is a side elevation and Figure 3 a front elevation thereof.

On each of two parallelly disposed shafts, 10, 11 the shaft 10 being the driving shaft which is itself rotated from any convenient source of power (such as the electric motor 12) and the other 11, being the driven shaft, is disposed a stepped grooved pulley; that is to say the pulleys 13, 14 are provided with a series of grooves 13a, 13b etc. and 14a, 14b etc. of graduated diameter. The pulleys 13, 14 are aligned and are disposed in an opposite sense; that is to say the step of greatest diameter of one pulley is in line with the step of smallest diameter of the other pulley, the step of smallest diameter of the first pulley is in line with the step of greatest diameter of the second pulley and the intermediate steps of each pulley are similarly disposed with respect to one another. The pulleys 13, 14 may be identical with one another. In the upstanding flange separating the several steps of each pulley a belt way is formed. These belt ways are conveniently formed by interrupting the flanges and so shaping them that a passageway is formed between adjacent steps which lies at an angle (conveniently an angle of 75°) to the axis of the shaft on which the pulley is mounted. The belt ways are so inclined in relation to the direction of rotation of the pulley that when a side thrust is applied to a belt 15 riding between the flanges of a step the belt follows the belt way in each pulley and moves to the next higher step on one pulley and the next lower step on the other pulley. When the belt 15 is on the end steps of the pulleys the side thrust will of course only be applied to the belt in a direction towards the middle of the pulley; when the belt is on any of the intermediate steps the thrust may be applied in either direction. For this reason each of the intermediate flanges are cut with two passageways leading in opposite directions, those leading in one direction being lettered a, b, c etc. and those in the other direction being lettered A, B, C etc. The two passageways in each flange are spaced 180° apart, and the two kinds of passageways alternate along the pulley as clearly shown in Fig. 1. The belt is of truncated V shape in section with the widest part outermost. In this unit, as in all mechanisms of the grooved pulley and V-belt type, the belt should not be permitted to bottom on the pulley grooves, and the passageways are arranged and disposed accordingly.

Disposed between the two parallel shafts 10, 11 is a belt shifting device. In the embodiment under consideration this device comprises a spring-pressed pulley 16 engaging with the aforesaid belt 15 and mounted for movement on a slide 17. This pulley 16 is conveniently rotatably mounted on a short shaft 18 parallel with the aforesaid parallel shafts 10, 11 and the ends of said short shaft 18 are slidably housed in two parallel slots 19 formed in the side cheeks 20 of the belt shifting unit. Said slots 19 are substantially at right angles to the lines of movement of the belt 15 between the stepped pulleys 13, 14. The ends of said short shaft 18 are connected by springs 21 to a fixed part of the belt shifting unit and said springs urge the pulley mounted on said short shaft outwardly to tension the belt 15. Said pulley 16 is a grooved pulley and is adapted to accommodate the belt 15 in its passage from one stepped pulley to the other and the said springs 21 urge such pulley into engagement with the belt and take up any slack in the belt; due to the fact that said short shaft 18 is slidable in said slots 19 it will be appreciated that the effective length of the belt between the stepped pulleys can in effect be varied. The said side cheeks 20 are of rectangular configuration with their long edges substantially parallel with the direction of the belt between the stepped pulleys and the slots 19 in the cheeks lie at right angles to said long sides. The distance between said cheeks 20 is slightly in excess of the pulley mounted on said short shaft and the cheeks are mounted as a unitary structure (being preferably connected by a strap) on a base 21a to slide on a fixed base plate 22. The base plate 22 is cut with an inclined slot 23 the angle of which conforms to the cone angle of the pulleys 13, 14, as will be seen from Fig. 1. In this slot 23 a slide 17 attached to the base 21a travels. The said slide 17 is actuated by a conveniently disposed handle 24 which may if desired be movable relatively to a graduated quadrant to indicate different speed ratios.

The belt passes over one stepped pulley, then between the said cheeks 20 and over the spring urged pulley 16 to the other stepped pulley and on its return to the first stepped pulley passes between the cheeks over the face of the base 21a. At each of the four corners of the cheeks where the belt 15 enters or leaves the cheeks a pair of guide rollers 25 is provided. The rollers of each pair are displaced from one another a distance greater than or substantially equal to the width of the belt and the axes of the rollers are substantially at right angles to the general direction of the belt. That is to say each lap of the belt travels between two pairs of rollers 25. The rollers of each pair are mounted on and fixed to the cheeks 20.

The belt shifter handle 24 is pivoted to the base plate 22 at 26 and is connected to the slide 17 by a screw 27 surrounded by a compression spring 28 that forces the handle 24 downwards so that the latter tends to engage in the recesses 29 of a gate or slot 30 provided at the front of the gear unit. An appropriate number of recesses 29 is provided corresponding to the number of steps in the pulleys and the number of gear ratios afforded thereby. In the illustrated example there are six. A device is provided for locating the handle 24 in the appropriate recess. This device comprises a slider 31 movable in guides 32 along the length of the slot 30 and provided with detent mechanism comprising spring pressed balls or plungers 33 co-operating with holes 34 appropriate to each position of the handle 24. The slider 31 is provided with a slot 35 for the handle 24, said slot having a recess 35' midway in the length of its lower edge, which recess 35' is adapted to be aligned with any selected recess 29. When changing speed the handle 24 is first raised against the action of spring 28 clear of the recess 35' and that recess 29 of the gate with which it registers. The handle is then moved to the right or left until it comes to the end of the slot 35 in the slider 31. Thereafter the slider 31 is moved with the handle so that the spring pressed plungers 33 disengage from one pair of holes 34 and then engage with the next pair of holes 34. The handle 24 is now beyond that recess 29 into which it should drop. This movement of the handle moves the pulley 16 and the latter moves the belt 15, and as each stepped pulley reaches the position in which the belt way in its flanges coincides with the position of the belt the belt rides from its first step on each pulley through the belt way on to the next adjacent step, rising up the step on one pulley and falling a similar amount on to the next step of the other pulley. The fact that the short shaft 18 carrying the pulley 16 of the belt shifter is spring mounted allows for the momentary increase in the effective length of the belt between the stepped pulleys during the change to be accommodated, and the rollers 35 prevent the belt from riding out of the pulley of the shift belt device in that they continue to guide the belt whilst permitting change of direction thereof relatively to such pulley. The aforesaid excessive movement of handle 24 is necessary in order to move the belt 15 from one step to the other successfully and quickly, but immediately the change has been made the lever 24 is moved in the reverse direction so that it engages in the recess 35' in the slider 31 and in the appropriate recess 29 aligned therewith.

In the illustrated example a second change-speed device is provided so that the number of gear ratios afforded by the pulleys 13, 14 is doubled. The motor 12 drives the shaft 10 which drives the driven shaft 11 as before described. The driven pulley 14 is, however, freely mounted on said shaft 11 and has a V pulley 39 connected to it. The latter drives a countershaft 40 through a belt 41 and pulley 42 and the countershaft drives another pulley 43, which is free on the shaft 11, through pulley 44 and belt 45. This pulley system 39, 42, 44, 43 affords a speed change (as illustrated, a speed reduction) as between pulleys 14 and 43. Either of these pulleys may be clutched to the driven shaft 11 by a double cone clutch 46 operated by handle 47. The shaft 11 may be provided with a power take-off pulley 48.

The change speed device is constructed as unitary structure, the base 22 being provided with vertical side members 49 between which the shafts are mounted and which support the motor 12 by means of a bracket 50. The tension of the belts may be adjusted by adjusting the shafts 10 and 40. For this purpose the said shafts are supported at their ends in bearing members 51 that are adjustably secured to the side plates 49 by means of bolts 52 extending through slots 53 in said side plates.

The aforesaid spring pressed pulley 16 is shown in the drawings bearing on the upper lap of the belt 15 but if desired two pulleys may be provided, one for each lap of the belt, either or both of which pulleys may be spring pressed or otherwise as desired.

I claim:

1. A change-speed device, comprising two stepped, grooved pulleys, means mounting them in opposite senses, an endless belt running in the grooves to transmit the drive from one pulley to the other, passageways on the pulley leading in opposite directions between successive grooves, and a belt shifter for shifting the belt, through the passageways, between successive steps on the pulley, which belt shifter comprises a grooved pulley engaging the belt between the stepped pulleys, and spring means biasing it against a lap of the belt.

2. A change-speed device, comprising two stepped, grooved pulleys; means mounting them in opposite senses; an endless belt running in the grooves to transmit the drive from one pulley to the other; passageways on the pulleys leading in opposite directions between successive grooves; and a belt shifter for shifting the belt, through the passageways, between successive steps on the pulley, which belt shifter comprises a grooved pulley engaging the belt between the stepped pulleys, and a pair of spaced rollers between which the belt passes to the grooved shifter pulley and another pair of spaced rollers between which the belt passes after leaving said shifter pulley, which rollers function to apply lateral thrust to the belt when being shifted.

3. A change-speed device according to claim 2 in which the axes of the rollers are substantially parallel and are substantially normal to the axis of the grooved pulley.

JOHN MELVILLE KENWORTHY.